United States Patent Office 3,481,850
Patented Dec. 2, 1969

3,481,850
SYNTHESIS OF FLUOROARENES
Robert C. Petterson and Anthony H. Dimaggio III,
Metairie, La., assignors to Research Corporation,
New York, N.Y., a non-profit corporation
No Drawing. Filed Aug. 1, 1967, Ser. No. 657,495
Int. Cl. B01j *1/10;* C07c *17/00*
U.S. Cl. 204—163                                      5 Claims

ABSTRACT OF THE DISCLOSURE

Aromatic fluorine compounds are produced by a modified Schiemann reaction where in the reactant aryldiazonium salt is decomposed photochemically rather than by pyrolysis.

---

Aromatic fluorine compounds constitute a well known class of organic compounds useful as agricultural pesticides, herbicides, pharmaceuticals and dyestuffs. See "Aromatic Fluorine Compounds" by Pavlath and Leffler, published by the Reinhold Publishing Company, New York (1962) and "Annual Reports in Medicinal Chemistry, 1965," edited by Cain, Academic Press, New York (1966).

The pyrolysis of solid aryldiazonium tetrafluoroborate, hexafluorophosphate or hexafluorosilicate salts (the Schiemann reaction) remains the most generally useful method of introducing a fluorine substituent into an aromatic ring. The solid salts are customarily pyrolized in the dry state since they and/or their reaction intermediates enter into side reactions with conventional solvents. The preparative reaction using the fluoroborate salt is illustrated as follows:

$$ArN_2BF_4 \rightarrow ArF + N_2 + BF_3$$

Aryldiazonium                Fluoroarene
Tetrafluoroborate

In the above equation, Ar represents an aryl moiety of the type whose diazonium salts are known to undergo the Schiemann reaction. Thus, the aryl moiety may be carbocyclic, heterocyclic, monocyclic, bicyclic and/or polycyclic, and may bear conventional non-interfering nuclear substituents. Aryl moieties of this type are well known to those skilled in the art of organic chemistry. See, for example, the article on the Schiemann reaction by Roe in "Organic Reaction," vol. V, p. 193, John Wiley & Sons, Inc., New York (1949).

Many fluoroarene compounds are difficult to make and hence are relatively high in cost because the classical Schiemann reaction sometimes gives low yields or fails completely. Certain compounds are unstable to the high temperatures used in the pyrolysis reaction, especially when Lewis acids such as boron trifluoride are present and the poor yields obtained can be attributed to the decomposition of reactants, intermediates and/or products.

We have discovered that the irradiation of aryldiazonium fluoroborate, hexafluorophosphate or hexafluorosilicate salts with ultraviolet light results in the formation of the corresponding fluoroarenes. Higher yields of product have been obtained in many cases where the classical Schiemann reaction has been reported to fail or give very low yields of the desired product.

It is, therefore, a principal object of the present invention to provide a novel non-pyrolytic approach to the preparation of fluoroarene compounds.

Our invention is the improvement in the Schiemann reaction for the preparation of aromatic fluorine compounds which comprises decomposing aryldiazonium salts of fluorine-containing acids by means of ultraviolet light. More specifically, our invention is a method of the preparation of a fluoroarene compound which comprises irradiating the corresponding aryldiazonium tetrafluoroborate, hexafluorophosphate or hexafluorosilicate salt with ultraviolet light.

The reactant diazonium salt may be made by any convenient method such as by anion exchange with the diazonium chloride formed by conventional diazotization of the corresponding amine. Aryldiazonium tetrafluoroborates may also be made directly by the action of sodium nitrate on the corresponding arylamine tetrafluoroborate salts. Aryldiazonium hexafluorophosphates may be readily prepared by anion exchange with the corresponding aryldiazonium tetrafluoroborates.

It is desirable that a maximal amount of ultraviolet energy be adsorbed by the diazonium salt undergoing decomposition in our process in order to achieve good yields of fluoroarene product. At the same time, the fluoroarene product, if unstable to the ultraviolet light used, must be protected from excess exposure to the energy source.

Efficient energy absorption by the reactant diazonium salt can be achieved by depositing it as a thin film on the walls of the reactor, preferably a quartz or borosilicate glass tube or flask. The film is most conveniently prepared by distribution of a solution of the reactant salt in a suitable solvent over a surface followed by evaporation of the solvent at temperatures low enough to avoid thermal decomposition.

Vacuum may often be employed to distil or sublime the fluoroarene product from the reactor as it is formed in order to minimize its exposure to the energy source. The reaction vessel is fabricated of borosilicate glass, rather than quartz, to give additional protection to those products which absorb below 3000 A. In other cases, Vycor, flint or other glass may be desirable. In more favorable cases, the film may be deposited on any inert surface such as stainless steel, porcelain, et cetera, and irradiated by means of a lamp located within the reaction vessel. Film formation and irradiation may be effected in a continuous manner by passing an endless belt or the like into a solution of the reactant diazonium salt, passing the belt coated with solution through a zone of warmed moving air to evaporate the solvent, passing the belt coated with a dry film of the reactant diazonium salt under a source of ultraviolet radiation, and removing the fluoroarene product from the belt to complete the cycle.

The photodecomposition of the fluoroarene once formed may also be avoided by using ultraviolet light of wave lengths which are absorbed by and decompose the reactant diazonium salt but which are not absorbed by and do not decompose the fluoroarene product. This technique is particularly useful in the synthesis of fluoroarenes which cannot be vacuum distilled or sublimed from the reactor as formed. For example, ultraviolet light of wavelengths in the range 3000–4000 A. is particularly desirable with most aryldiazonium salts having an amino auxochrome. The use of such light results in the decomposition of the diazonium compound but has little or no effect on the resultant aminofluoroarene product. It is apparent that filters on a mercury arc lamp or other light sources can be used with compounds bearing different auxochromes. So-called "fluorescent sun lamps," for example, provide ultraviolet light in the 3250 A. region, "erythemal" lamps have peak emissions at 3000 A. and low pressure mercury lamps at 2537 A. Reflection of the incident radiation can be minimized by conventional anti-scattering techniques such as by the use of an unreactive liquid or solid such as a fluoride salt in conjunction with the reactant diazonium salt.

Our invention is further illustrated by means of the following non-limiting examples.

EXAMPLE 1.—4-FLUORODIPHENYLAMINE 4-phenylaminobenzenediazonium fluoroborate was deposited in the form of a thin crystalline film from an evaporating methanol solution in an evacuated 3 liter Pyrex vessel. Irradiation at 30° for 24 hours with light from a 3500 A. source decomposed about 90% of the starting material. A 37% yield of 4-fluorodiphenylamine was isolated by steam distillation. A sample separated by gas-liquid chromatography (single peak) melted at 35–36° as reported in the prior art and had an infrared spectrum consistent with the assigned structure. Lichtenberger and Thermet, Bull. Soc. Chem. France, 318 (1951), reported that conventional pyrolysis of 4-phenylaminobenzenediazonium fluoroborate gave only a carbonaceous mass.

EXAMPLE 2.—4-FLUORO-N,N-DIMETHYLANILINE

A 30 cm. x 3.5 cm. I.D. Pyrex tube coated on the inside with two grams of commercial N.N-dimethylaminobenzenediazonium fluoroborate was irradiated with 3500 A. light for 17 hours while attached to a rotary evaporator under vacuum (15 cm. Hg. pressure). Decomposition was complete as evidenced by the absence of the 2150 cm.$^{-1}$ absorption peak. Alkali was added and the reaction mixture steam distilled to give a 55% yield of 4-fluoro-N,N-dimethylaniline, M.P. 29–30° after one recrystallization. The product had the same infrared spectrum and g.l.c. retention time as a sample previously prepared by pyrolysis. Schiemann and Winkelmuller, Ber. 66, 727 (1933), reported a 17% yield of product M.P. 25° C. by pyrolysis.

EXAMPLE 3.—4-FLUORO-N,N-DIETHYLANILINE (A) In a similar experiment, one gram of commercial p-N,N-diethylaminobenzenediazonium fluoroborate photolyzed for 4.5 hours gave a 53% yield of 4-fluoro-N,N-diethylaniline. The product obtained by photolysis appeared pure whereas that obtained by pyrolysis appeared to contain considerable diethylaniline. The Schiemann and Winkelmuller yield on conventional pyrolysis (mixed with sand) was 20% of the desired product.

(B) Using the same general procedure as in the previous example, but on a larger scale, 10 grams of the reactant diazonium salt was deposited in the walls of a 3 liter Pyrex round bottomed flask. Decomposition was complete after 49 hours of irradiation. The reaction mixture was worked up by steam distillation as in the previous example and a 66% yield of product was obtained.

(C) In a similar fashion, the irradiation of one gram of N,N-diethylaminobenzenediazonium hexafluorophosphate in a 3 liter flask for 4 hours with 3000–4000 A. ultraviolet light gave a 72% yield of substantially pure p-fluoro-N,N-diethylaniline.

(D) Using the same general procedure as in the previous example, but on a larger scale, 10 grams of the reactant hexafluorophosphate was irradiated for 94 hours to give a 74% yield of highly pure p-fluoro-N,N-diethylaniline.

EXAMPLE 4.—p-METHOXYFLUOROBENZENE

About one gram of p-methoxybenzenediazonium fluoroborate was deposited on the wall of a 3 liter Pyrex round bottom flask as before. A high-vacuum oil pump protected by a Dry Ice cooled finger trap was used to remove the volatile products from the reaction flask as formed. The flask was irradiated with eleven 3500 A. lamps for 18 hours at which time decomposition of the diazonium salt was found to be complete. The contents of the cold trap were taken up in ether, dried over anhydrous sodium sulfate and the solvent evaporated. p-Fluoranisole (pure by g.l.c. analysis) was obtained in a 69% yield.

EXAMPLE 5.—FLUOROBENZENE

About one-half gram of benzenediazonium fluoroborate was evaporated onto the walls of a large quartz test tube. After removing the last trace of solvent under vacuum, the salt was irradiated for 24 hours with the light from a 500 watt Uviarc high pressure mercury lamp. The reaction product was leached with 20 ml. of ether and dried over anhydrous sodium sulfate containing a small amount of anhydrous potassium carbonate to remove any dissolved boron trifluoride. After carefully distilling out the ether, a 23% yield of fluorobenzene remained. The product was identified by g.l.c. retention times and its infrared spectrum.

EXAMPLE 6.—3-FLUOROBIPHENYL

Using an approach similar to that of the previous example, 3-phenylbenzenediazonium fluoroborate was irradiated with 3500 A. ultraviolet light. On work up, there was obtained a 28% yield of 3-fluorobiphenyl.

EXAMPLE 7.—p-FLUOROCHLOROBENZENE p-Chlorobenzenediazonium fluoroborate was irradiated in a quartz tube for 8 hours with a high pressure Uviarc mercury lamp using a vacuum of about 1 mm. of Hg. to remove the product from the reaction zone as fast as it was formed. p-Fluorochlorobenzene was recovered from the Dry Ice-acetone trap between the pump and the reaction system.

EXAMPLE 8.—1-FLUORONAPHTHALENE

One gram of 1-naphthalenediazonium hexafluorophosphate, M.P. 99.5–101.5° C., was deposited from an acetonitrile-acetone solution and irradiated with 3500 A. light for 10 hours. The product was isolated by extraction and was identical on comparison with a commercially available sample of 1-fluoronaphthalene.

EXAMPLE 9.—3-FLUOROPYRIDINE 3-pyridinediazonium hexafluorophosphate was prepared by adding 65% of fluorophosphoric acid dropwise to a cold solution made by adding a solution of 4.2 g. sodium nitrite in 40 ml. of water to a solution of 5 g. of 3-aminopyridine in 50 ml. of water and 4 ml. of concentrated hydrochloric acid with efficient cooling and stirring. After one hour, the solid product was filtered, washed, and dried in a vacuum. The yield was 5.3 g. of 3-pyridinediazonium hexafluorophosphate, M.P. 56.5–57.5° C. (partial decomposition at 41–42° C.). Caution should be exercised as the diazonium salt may decompose spontaneously at room temperature.

About 0.5 g. of 3-pyridinediazonium hexafluorophosphate in a three liter flask was irradiated with a 3500 A. source. There was obtained a 27% yield of 3-fluoropyridine identical with a sample obtained by thermal decomposition of the same reactant diazonium fluorophosphate.

EXAMPLE 10.—8-FLUOROQUINOLINE

A one gram film of 8-quinolinediazonium tetrafluoroborate deposited on the inner surface of a flint glass bottle was irradiated for 54 hours with 3500 A. light. A 19% yield of 8-fluoroquinoline was obtained. (The product was identified as its picrate salt, M.P. 170–171° C., as reported in the literature.)

The process of the present invention is illustrated by means of examples showing the photolytic decomposition of aryldiazonium tetrafluoroborate and hexafluorophosphate salts. The hexafluorosilicate salts, while more difficult to prepare than the tetrafluoroborate and hexafluorophosphate salts, behave in a similar manner on exposure to ultraviolet light.

Other variations an modifications of the novel photolytic process of our invention in addition to those exemplified above will suggest themselves to those skilled in the art. Our invention is as claimed.

We claim:
1. The improvement in the Schiemann reaction for the preparation of aromatic fluorine compounds which comprises decomposing aryldiazonium salts of fluorine-containing acids by means of ultraviolet light.
2. A method for the preparation of a fluoroarene compound which comprises irradiating the corresponding aryldiazonium tetrafluoroborate, hexafluorophosphate or hexafluorosilicate salt with ultraviolet light.
3. A method according to claim 2 wherein the reactant aryldiazonium salt is in the form of a thin film.
4. A method according to claim 3 wherein the fluoroarene compound is removed from the irradiation zone as formed.
5. A method according to claim 4 wherein the fluoroarene compound is removed under vacuum.

References Cited
UNITED STATES PATENTS 3,251,890   5/1966   Haszeldine et al. ___ 204—163 X HOWARD S. WILLIAMS, Primary Examiner